United States Patent
Zhang

(10) Patent No.: US 8,170,612 B2
(45) Date of Patent: *May 1, 2012

(54) COMMUNICATION APPARATUS

(75) Inventor: Yue Zhang, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/039,826

(22) Filed: Mar. 3, 2011

(65) Prior Publication Data

US 2011/0151893 A1   Jun. 23, 2011

Related U.S. Application Data

(62) Division of application No. 11/949,116, filed on Dec. 3, 2007, now Pat. No. 7,983,714.

(30) Foreign Application Priority Data

Dec. 8, 2006 (JP) .................................. 2006-332278

(51) Int. Cl.
 *H04W 88/02* (2009.01)
(52) U.S. Cl. ...................... 455/557; 455/419; 455/67.11; 455/420
(58) Field of Classification Search ............. 455/557, 455/517, 418, 41.2, 435.1, 414.1, 414.2, 455/419, 420, 550.1, 515, 67.11, 68, 412.2; 709/227, 223, 224
See application file for complete search history.

(56) References Cited

U.S. PATENT DOCUMENTS

| 7,634,299 | B2 * | 12/2009 | Mise et al. ..................... 455/567 |
| 2004/0087373 | A1 | 5/2004 | Choi | |
| 2004/0153673 | A1 * | 8/2004 | Kitano .......................... 713/201 |

FOREIGN PATENT DOCUMENTS

JP   2001-244928 A   9/2001

* cited by examiner

*Primary Examiner* — John J Lee
(74) *Attorney, Agent, or Firm* — Holtz, Holtz, Goodman & Chick, P.C.

(57) ABSTRACT

A communication device communicates with another communication device via an information managing device. The communication device includes a transmitter unit, a storage unit, and a control unit. The transmitter unit transmits presence information to the other communication device via the information managing device. The storage unit stores a program. If the communication device executes the program, the control unit judges whether the presence information currently registered needs to be changed based on executing the program. If the control unit judges that the presence information currently registered needs to be changed, the control unit changes the presence information based on executing the program. The control unit controls the transmitter unit to transmit the changed presence information as updated presence information to the other communication device via the information managing device.

8 Claims, 16 Drawing Sheets

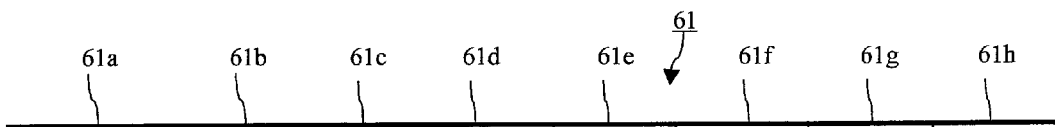

| telephone number information | name information | call information | mail information | PTT information | mood state information | comment information | IMS service information |
|---|---|---|---|---|---|---|---|
| 090-**-** | Taro Yamada | NG | NG | OK | sleepy | I was up all night!! | Online |
| 090-**-** | Hanako Aoki | OK | OK | OK | feel good | I want to go to shopping! | Online |
| 090-**-** | Takeshi Akagawa | NG | OK | OK | PTT telephone calling | Now PTT telephone calling | Online |
| 090-**-** | Shiro Suzuki | NG | OK | NG | angry | Please listen to my idea! | Offline |
| ... | ... | ... | ... | ... | ... | ... | ... |

Fig.6

| owner's telephone number information | member telephone number information |
|---|---|
| 090-**- | 090--** |
| | 090-**-** |
| | 090-**-** |
| | 090-**-** |
| | . . . |
| 090-**- | 090--** |
| | 090-**-** |
| | 090-**-** |
| | 090-**-** |
| | 090-**-** |
| | . . . |
| 090-**- | 090--** |
| | 090-**-** |
| | 090-**-** |
| | 090-**-** |
| | . . . |
| . . . | . . . |

Fig.10

COMMUNICATION APPARATUS

CROSS-REFERENCE TO RELATED APPLICATIONS

This is a Divisional Application of U.S. application Ser. No. 11/949,116, filed Dec. 3, 2007 now U.S. Pat. No. 7,983,714, which is based upon and claims the benefit of priority from prior Japanese Patent Application No. 2006-332278, filed Dec. 8, 2006, the entire contents of both of which are incorporated herein by reference.

FIELD OF THE INVENTION

The present invention relates to a communication apparatus, for example a cellular phone, or PDA.

DESCRIPTION OF THE BACKGROUND

Recently, there has been known a technique in which the standard of IMS (IP Multimedia Subsystem) is equipped in an information processing device such as a cellular phone or the like, messages are communicated (transmitted/received) among mates (friends) and the information is registered in a server on a real-time basis so that the information is shared by the mates and the present states are mutually notified among the mates (see JP-A-2001-244928).

A presence information notifying function has been used as the function using IMS as described above. With respect to this presence information notifying function, it is expected that more intimate communications can be performed by mutually notifying, as presence information, communication means which users desire at present. With respect to cellular phones that mutually notify presence information to one another, it is desired that the presence information be mutually notified on a real-time basis not only in a case where the setting of some presence information is changed by a user, but also in a case where an application program is started, etc.

Particularly, in an information processing device such as a cellular phone or the like, three types of functions of telephone call, video telephone and PTT (Push To Talk) are mainly used as functions using a voice path (receiver, microphone). In the process of using one of these functions, the function of newly using another voice path cannot be started due to the fact that there is typically only one voice path.

In a case where resource competition of voice paths as described above occurs, it is desired to notify other cellular phones that "response impossible" is set as the present state and application programs using other voice paths are unusable when an application program requiring a voice path is started.

SUMMARY OF THE INVENTION

The present invention provides a cellular phone that can mutually communicate presence information with other cellular phones on a real-time basis if an application program is started or the like.

BRIEF DESCRIPTION OF THE DRAWINGS

FIG. 6 is a diagram showing a data structure representing friend presence information stored in the cellular phone according to the present invention;

FIG. 10 is a diagram showing the data structure of a friend list information stored in the information managing device;

DETAILED DESCRIPTION OF THE PREFERRED EMBODIMENTS

Preferred embodiments according to the present invention will be described hereunder with reference to the drawings.

An embodiment of a cellular phone 1 according to the present invention will be described with reference to the accompanying drawings.

Figure 1:
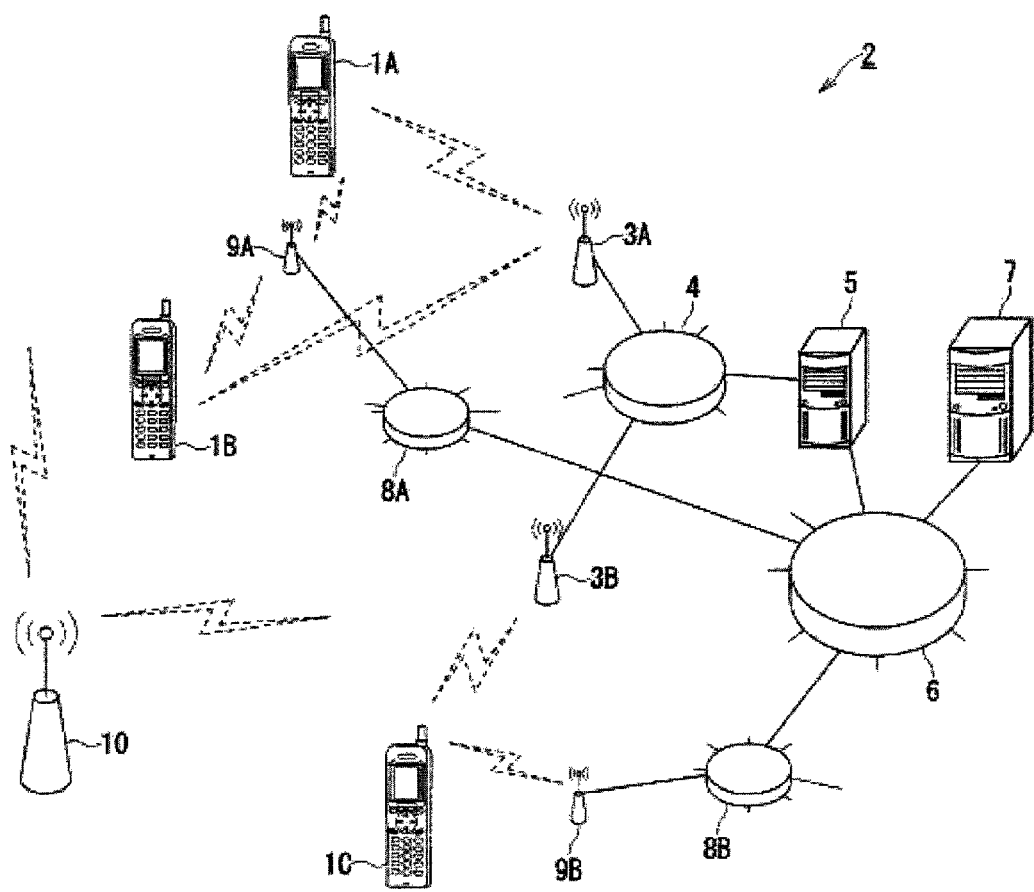
FIG. 1 is a diagram showing the construction of a network system to which a cellular phone of the present invention is applied.

FIG. 1 is a diagram showing the construction of a network system 2 to which the cellular phone 1 according to the present invention is applied.

A network system 2 includes base stations 3A, 3B, etc. as fixed wireless stations each of which is located in each of cells to which a communication service supply area. Cellular phones 1A, 1B, 1C, etc. are wirelessly connected to the base stations 3A, 3B, etc. by a code division multiple access system such as the W-CDMA (Wideband-Code Division Multiple Access) system. For example, large-capacity and high-speed data communications can be performed at a data transfer speed of 2 Mbps under the stationary state and 384 kbps under the moving state by using a 5 MHz band of a 2 GH frequency band.

The cellular phone 1 can perform various data communications including not only a telephone call, but also transmission/reception of electronic mails, browsing of simple homepages, transmission/reception of images, etc.

The base stations 3A, 3B, etc. are connected to a public circuit network 4 through wire circuits, and an access server 5 of an Internet service provider is connected to the public circuit network 4. An information managing device 7 such as a general PC or the like which is used as a server is connected to the access server 5 through a network (containing the Internet, LAN (Local Area Network), WAN (Wide Area Network), and other types of networks, for example).

Furthermore, plural wireless LAN networks 8A, 8B, etc. are connected to this network 6, and the cellular phone 1 can perform communication through access points 9A, 9B, etc. of the wireless LAN networks 8A, 8B, etc.

The network system 2 is equipped with a base station 10 for performing ground-based digital one-segment broadcasting or the like, and the cellular phone 1 receives the ground-based digital one-segment broadcasting or the like from the base station 10 and subjects it to audio-visual processing and recording processing.

Figure 2A:
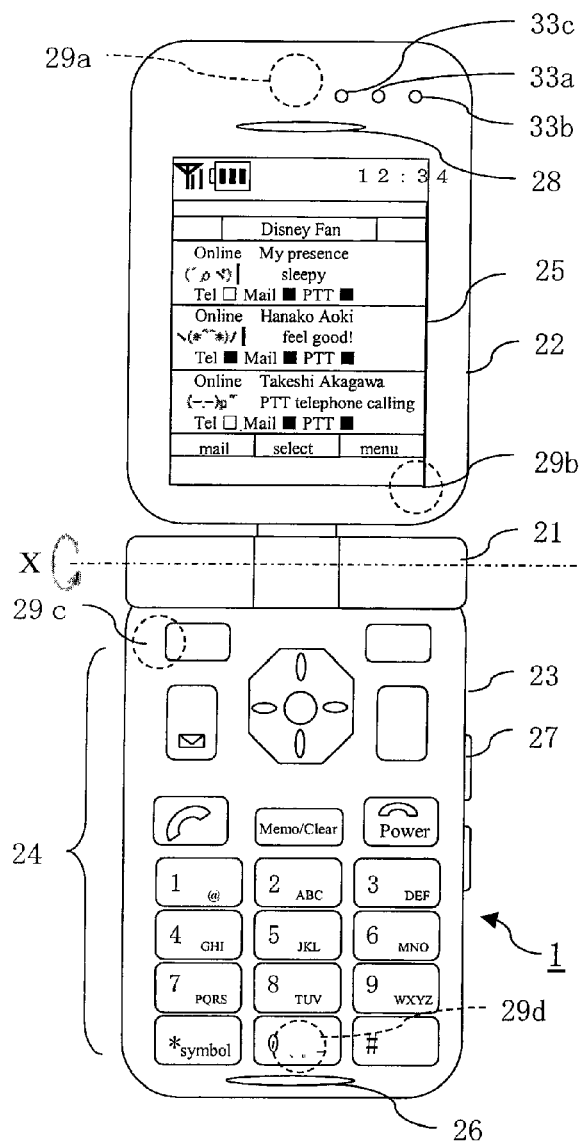
FIGS. 2A and 2B are front and side views, respectively, of the cellular phone according to the present invention when fully unfolded.
Figure 2B:
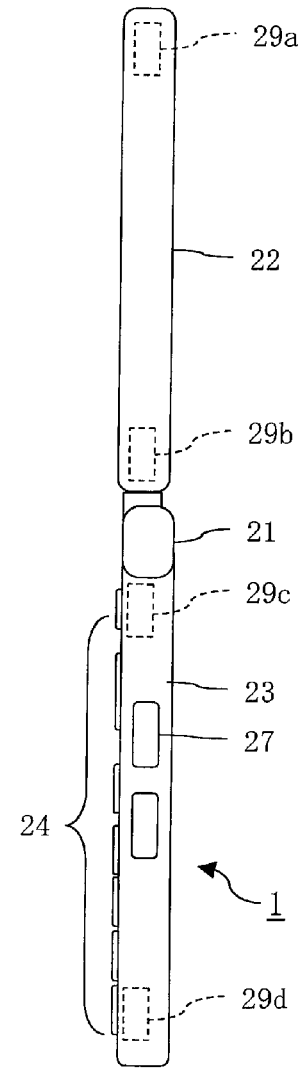
Figure 3A:
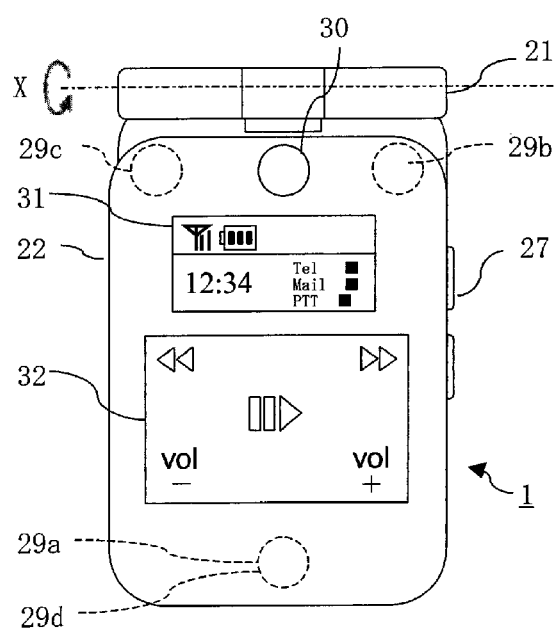
FIGS. 3A and 3B are front and side views, respectively, of the cellular phone according to the present invention when folded.
Figure 3B:
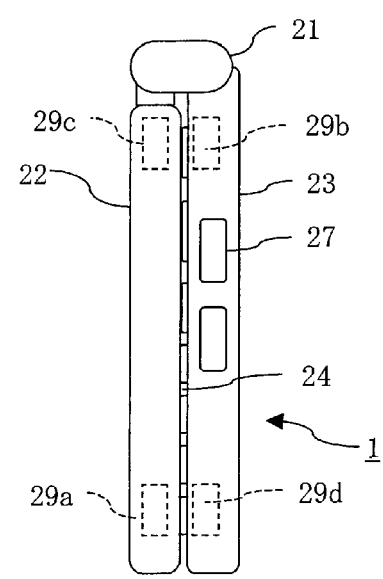

FIGS. 2A and 2B and FIGS. 3A and 3B are diagrams showing a folding cellular phone used as an example of the cellular phone 1. FIG. 2A is a front view of the cellular phone 1 in a state in which the cellular phone 1 is fully unfolded by about 180 degrees, and FIG. 2B is a side view of the cellular phone 1 in a state in which the cellular phone 1 is fully unfolded. FIG. 3A is a front view of the cellular phone 1 in the state in which the cellular phone 1 is folded, and FIG. 3B is a side view of the cellular phone 1 in the state in which the cellular phone 1 is folded.

In the cellular phone 1, a first housing 22 and a second housing 23 are coupled to each other through, for example, a hinge so as to sandwich a hinge portion 21 at the center therebetween as shown in FIGS. 2 and 3, and the cellular phone is foldable in the X direction of FIG. 2. A transmission/reception antenna (antenna 57 of FIG. 4 described later) is provided at a predetermined position in the cellular phone 1, and the cellular phone 1 transmits/receives electrical waves to/from the base station (not shown) through the built-in antenna 57.

A main display 25 is provided at the center portion of the first housing 22. An antenna pictograph representing the present sensitivity level of the antenna 57, a battery pictograph representing the present residual battery amount of the cellular phone 1, the present time, etc. are displayed at the upper portion of the main display 25. Presence information of members of a group, comments, etc. are displayed at the center portion of the main display 25. Furthermore, processing contents such as "mail", "select", "menu", etc. representing that any processing is allocated to operating keys 24 (described later) are displayed. The presence information is information for communicating with the members of the group including the owner of the phone, and includes information indicating whether a telephone call is possible or not, whether receiving electronic mail is possible or not, whether a PTT connection is possible or not, whether a TV call is possible or not, a comment set by the members, whether IMS function is offline or online, and mood state information set by the members.

Furthermore, a speaker 28 is provided at a predetermined position of the upper portion of the main display 25, and a user can listen to voices (or sounds) from the speaker.

The first housing 22 is equipped with the operation keys 24 such as ten-key keypads of "0" to "9", a calling key, redialing key, a call-ending/power key, a clear key, an electronic mail key, etc. on the surface thereof, and a user can input various instructions by using the operation keys 24.

The first housing 22 is provided with a cross key and an enter key as the operation keys 24 at the upper portion thereof, and the user operates the cross key in the up-and-down direction and right-and-left direction so that an allocated cursor can be moved in the up-and-down direction and right-and-left direction. Specifically, a scroll operation for a phone book and electronic mails displayed on the main display 25, a browsing operation of browsing homepages, and a scroll operation of an image, etc. can be executed.

Furthermore, various functions can be settled by pushing down the enter key. For example, in the first housing 22, if a desired telephone number is selected from plural telephone numbers of the phone book displayed on the main display 25 in accordance with user's operation of the cross key, and the enter key is pressed in the inward direction of the first housing 22, the selected telephone number is settled and the calling processing on the selected telephone number is executed.

Furthermore, the first housing 22 is provided with an electronic mail key at the left side of the cross key and the enter key, and if the electronic mail key is pushed in the inward direction of the first housing 22, the mail transmission/reception function can be executed. A browser key is provided at the right side of the cross key and the enter key, and if the browser key is pushed in the inward direction of the first housing 22, the data of Web pages can be browsed. The electronic mail key and the browser key provided at the right and left sides of the cross key and the enter key can be provided with various functions such as "Yes", "No", etc. in connection with the screen displayed on the main display 25, for example. Therefore, they are referred to as soft 1 key and soft 2 key, respectively.

The first housing 22 is further provided with a microphone 26 at the lower side of the operation keys 24, and the voice of the user during a telephone call is collected by the microphone 26. Furthermore, a side key 27 for operating the cellular phone 1 is provided to the first housing 22.

A battery pack (not shown) is inserted and mounted at the back side of the first housing 22, and if the call-ending/power key is set to an ON-state, power is supplied from the battery pack to respective circuit portions so that the cellular phone 1 is activated to be operable.

Magnetic sensors 29a, 29b, 29c and 29d for detecting the state of the cellular phone 1 are provided at a predetermined position in the first housing 22 and the second housing 23.

A CCD camera 30 is provided at the upper portion of the second housing 23, so that the user can pick up an image of a desired image pickup target.

A sub display 31 is provided at the lower portion of the CCD camera 30, and an antenna pictograph representing the present level of sensitivity of the antenna 57, a battery pictograph representing the present residual amount of the battery of the cellular phone 1, the present time, etc. are displayed on the sub display 31. Furthermore, presence information (described later) is displayed on the sub display 31. This presence information may be the presence information of the owner of the cellular phone 1 concerned or presence information of a friend (mate) registered in the phone book or presence information of member(s) of the group. For example, the displayed presence information may be the presence information of a friend registered at the head of the phone book, or the presence information of a pre-selected friend.

An electrostatic touch pad 32 is provided at the lower side of the sub display 31. The electrostatic touch pad 32 may be a one touch pad, and may be provided with sensors at plural positions. If the user touches the neighborhood of a sensor, the sensor detects the user's touch and executes a rewinding function, a fast feeding function, a volume down operation, a volume up operation, a reproducing operation, a temporarily stop operation or the like.

Furthermore, three LEDs (Light Emitting Diode) 33a to 33c are provided at predetermined positions at the upper side of the speaker 28, and by turning on and off or turning on the LEDs 33a to 33c, the presence information of the user, etc. in the cellular phone 1 can be notified to the user.

Figure 4:
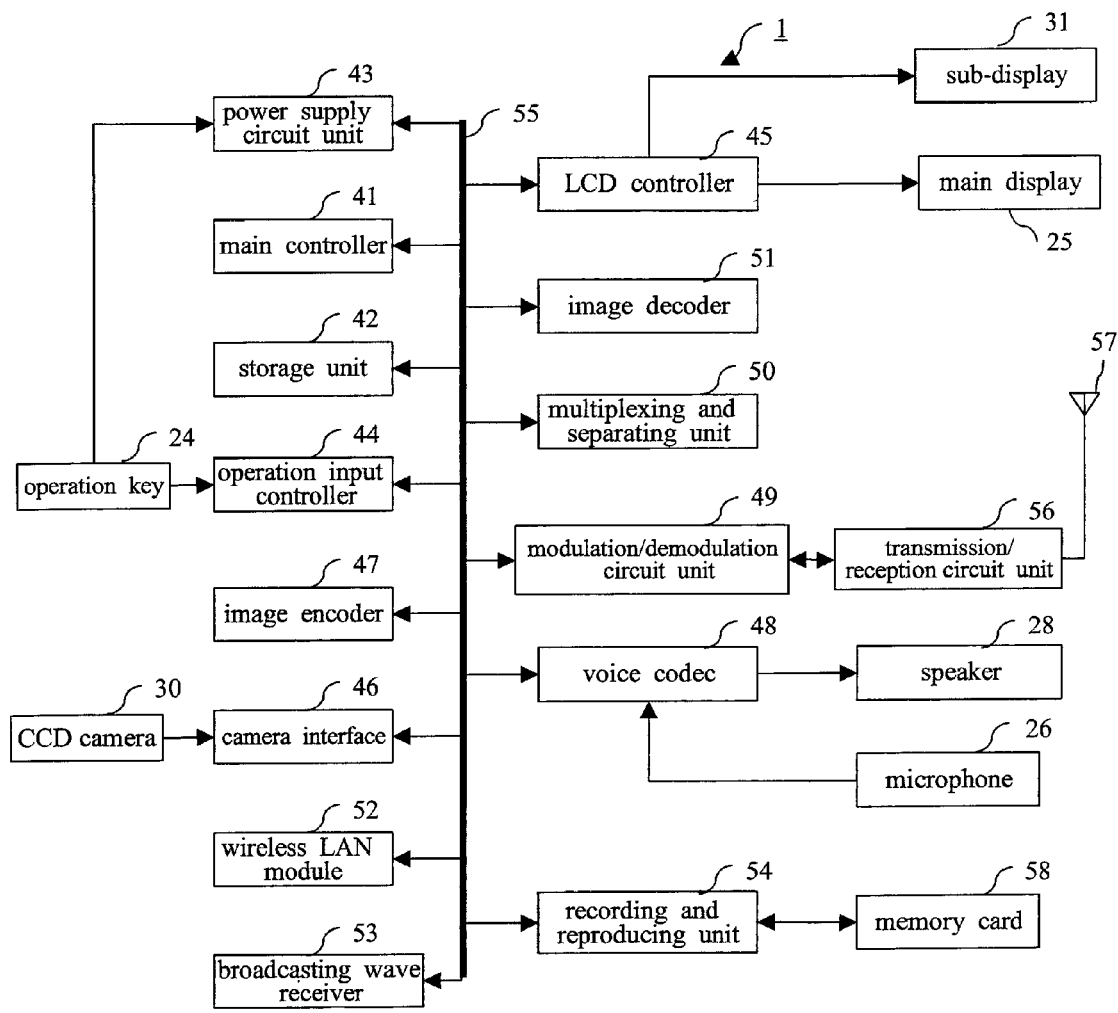
FIG. 4 is a diagram showing the construction of the cellular phone according to the present invention.

FIG. 4 is a diagram showing the functional construction of the cellular phone 1.

As shown in FIG. 4, the cellular phone 1 comprises a main controller 41, a storage unit 42, a power supply circuit unit 43, an operation input controller 44, an LCD controller 45, a camera interface 46, an image encoder 47, a voice codec 48, a modulation/demodulation circuit unit 49, a multiplexing and separating unit 50, an image decoder 51, a wireless LAN module 52, a broadcasting wave receiver 53 and a recording and reproducing unit 54 which are mutually connected to one another through a bus 55.

The main controller 41 comprises CPU (Central Processing Unit) for executing various kinds of data processing and operations. The storage unit 42 comprises ROM (Read Only Memory) for storing processing programs, etc. executed by the main controller 41, a magnetic storage device such as a hard disk or the like, and an electrical storage device such as RAM for temporarily storing data used when the main controller 41 executes the processing. The storage unit 42 may store profile information of the owner of the cellular phone itself, a phone book containing the profile information of friends, digital photograph information, etc. Furthermore, a timer for counting the present date and time is contained in the main controller 41.

The power supply circuit unit 43 switches ON and OFF states in response to an input of each operation key 24 by the user, and supplies from the power source (battery pack or the like) power to each unit when the power source is set to the ON state, thereby enabling the cellular phone to operate.

The operation input controller 44 transmits the data input by the operation key 24 to the main controller 41.

The LCD controller 45 executes the processing of displaying image data on the main display 25 or the sub display 31 under the control of the main controller 41.

The camera interface 46 displays an image signal picked up by the CCD camera 30 on the main display 25 or sub display 31 through the LCD controller 45.

Under the control of the main controller 41, the image encoder 47 subjects an image signal input from the CCD camera 30 to compression-coding according to a predetermined encoding system such as MPEG-4 (Moving Picture Experts Group-4) or the like to create image data, or converts coded image data to data based on another encoding system to create new image data.

The voice codec 48 generates an analog audio signal from sounds collected by the microphone 26 under the control of the main controller 41.

The modulation/demodulation circuit unit 49 receives the analog audio signal from the voice codec 48, converts the analog audio signal to the digital audio signal and then transmits the digital audio signal to the transmission/reception circuit unit 56. The transmission/reception circuit unit 56 transmits the digital audio signal through the antenna 57.

Furthermore, the modulation/demodulation circuit unit receives the digital audio signal which the transmission/reception circuit unit 46 receives through the antenna 57, and converts the digital audio signal to the analog voice signal. The voice codec 48 receives this analog audio signal and outputs it as sounds from the speaker 28.

The multiplexing and separating unit 50 executes the multiplexing processing of multiplexing plural signals to generate a multiplexed signal, and the separation processing of separating a multiplexed signal to plural signals.

For example, the multiplexing and separating unit 50 separates a multiplexed video signal (multiplexed moving picture signal) input from the modulation/demodulation circuit unit 49 into a coded video signal and audio signal, and transmits the coded video signal through the main bus to the image decoder 51, and also transmits the audio signal to the voice codec.

The multiplexing and separating unit 50 multiplexes the video signal input from the image encoder 47 and the audio signal input from the voice codec according to a predetermined system, and transmits the resultant multiplexed signal to the modulation/demodulation circuit unit 49.

The image decoder 51 receives the coded video signal from the transmission/reception circuit unit 56, decodes the coded video signal according to the decoding system corresponding to the predetermined encoding system to generate a reproduced video (moving picture) signal, and then transmits the generated reproduced moving picture signal to the LCD controller 45. The LCD controller 45 displays this generated moving picture signal on the main display 25 or the sub display 31.

The wireless LAN module 52 carries out wireless LAN communications conforming with a predetermined standard such as IEEE802.11a/b/g or the like through a built-in antenna (not shown).

The broadcast wave receiving unit 53 receives broadcast waves such as ground-based digital one-segment broadcasting waves, ground-based digital broadcast, ground-based 3-segment radio broadcast waves or the like. The broadcast wave receiving unit 53 executes viewing processing in which the reception data of the ground-based digital one-segment broadcast waves are separated into an audio signal and a video signal by the multiplexing and separating unit 50, the video signal is displayed on the main display 25 by the LCD controller 45, and the audio signal is output through the speaker 28 by the voice codec 48. Furthermore, the broadcast wave receiving unit 53 executes the recording processing of storing the reception data of the ground-based digital one-segment broadcast waves by the storage unit 42.

The recording and reproducing unit 54 has an interface for an external memory such as a memory card 58 or the like, and executes the writing processing and the reading processing on the memory card 58 or the like.

When data such as an electronic mail or the like is transmitted, the main controller 41 transmits the text data of the electronic mail input by the operation input controller 44 through the operation input controller 44 to the main controller 41. The main controller 41 subjects the text data to spectrum diffusion processing in the modulation/demodulation circuit unit 49, executes digital analog conversion processing and frequency conversion processing on the above processed data in the transmission/reception circuit unit 56, and then transmits the resultant data through the antenna 57.

Furthermore, when receiving data such as an electronic mail or the like, the main controller 41 subjects the reception signal received through the antenna 57 to spectrum reverse diffusion processing in the modulation/demodulation circuit unit 49 to restore original text data, and then displays this text data as a reception mail on the main display 25 or the sub display 31 through the LCD controller 45. Thereafter, the main controller 41 records the reception mail through the storage unit 42 or the recording and reproducing unit 54 into the memory card 58 in accordance with the user's operation.

Various kinds of application programs executed by the main controller 41 can be installed in the storage unit 42 in advance. Furthermore, the various kinds of application programs executed by the main controller 41 may be installed into the storage unit 42 by downloading these data through a communication line. Furthermore, the various kinds of application programs executed by the main controller 41 may be recorded in the memory card 58, read out by the recording and reproducing unit 54 and installed into the storage unit 42.

The cellular phone 1 has a presence information notifying function of mutually notifying the presence information representing the present state among the members of the group, and the main controller 41 of the cellular phone 1 displays the presence information of some members of the group on the main display 25 in response to a request from the user. In addition, the members of the group may include the owner of the cellular phone. And the main controller 41 of the cellular phone 1 may display the presence information of the owner.

The cellular phone 1 notifies desired communication means for the user of the cellular phone 1 as presence information, thereby promoting mutual communications to be smoothly performed.

Particularly when an application program using a voice path (for example microphone 26 and speaker 28) in the cellular phone 1 is executed, it is desired that the presence information can be changed on a real-time basis. The application program using a voice path in the cellular phone 1 is, for example, a telephone call, a video telephone call, or PTT (Push To Talk) and so on. But when the cellular phone 1 executes such an application program using a voice path, another application program using another voice path cannot be newly started because typically there is only one voice path, and that voice path is occupied.

Therefore, the cellular phone 1 executes an owner's presence information renewal processing of renewing the presence information in accordance with a user's operation such as the start of an application program using a voice path.

Figure 5:
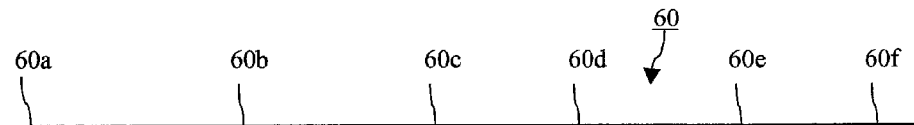
FIG. 5 is a diagram showing a data structure of presence information renewal processing information.

The processing content of the presence information renewal processing as shown in FIG. 5 is stored as presence information renewal processing information 60 in the storage unit 42 of the cellular phone 1. The presence information renewal processing information 60 may contain program information 60*a* representing the cellular phone executing program, telephone call processing information 60*b* representing whether or not the cellular phone 1 can receive a call, mail processing information 60*c* representing whether or not the cellular phone 1 can receive a mail, PTT telephone call processing information 60*d* representing whether or not the cellular phone 1 can receive a PTT telephone call, and comment information 60*e* representing a comment displayed when the processing represented by the program information 60*a* is executed, and IMS service information 60*f* representing whether or not the cellular phone 1 is set to an INS service. In addition, a program of the program information 60*a* may be executed by the operation of the application program using the voice path, or may be executed by the user. For example, the program information 60*a* may include a program for an incoming call, telephone call, PTT connection, outgoing TV call, recording a call, taking a picture, or taking a movie.

For example, in the typical case where the cellular phone 1 has only one voice path, if the application program of the telephone call processing is started by the user, the main controller 41 of the cellular phone 1 sets IMS service information 61*h* of the owner's presence information to Offline as shown at the uppermost stage of FIG. 5, sets call information 61*c* of the owner's presence information to an unusable state, sets PTT information of the owner's presence information to an unusable state, and changes comment information of the owner's presence information to "during telephone call" which is stored as the comment information 60*e* of the presence information renewal processing information 60 in advance. In this case, with respect to mail information 61*d* of the owner's presence information, it is unnecessary to change the mail (which remains in a usable state).

Furthermore, member presence information 61 as shown in FIG. 6 is stored in the storage unit 42 of the cellular phone 1. When the presence information of a member of the group is received from the information managing device 7, the cellular phone 1 re-stores the presence information of the member to the member presence information 61 of the storage unit 42 as needed. In addition, if an action of renewing the presence information of the owner is received by the user, the cellular phone 1 transmits the presence information as the member presence information 61 to the information managing device 7, and re-stores the presence information of the member (owner) to the member presence information 61 of the storage unit 42. The member presence information 61 may contain, for every member of the group, telephone number information 61*a* representing a telephone number, name information 61*b* representing the name, call information 61*c* representing whether a telephone call is possible or not, mail information 61*d* representing whether receiving mail is possible or not, PTT information 61*e* representing whether a PTT telephone call is possible or not, mood state information 61*f* representing the user's mood state by a pictogram, a face mark, a basic text or the like, comment information 61*g* representing a comment input by the user, and IMS service information 61*h* representing whether or not a cellular phone which the member of the group has is online and connected to the information managing device 7.

Figure 7:
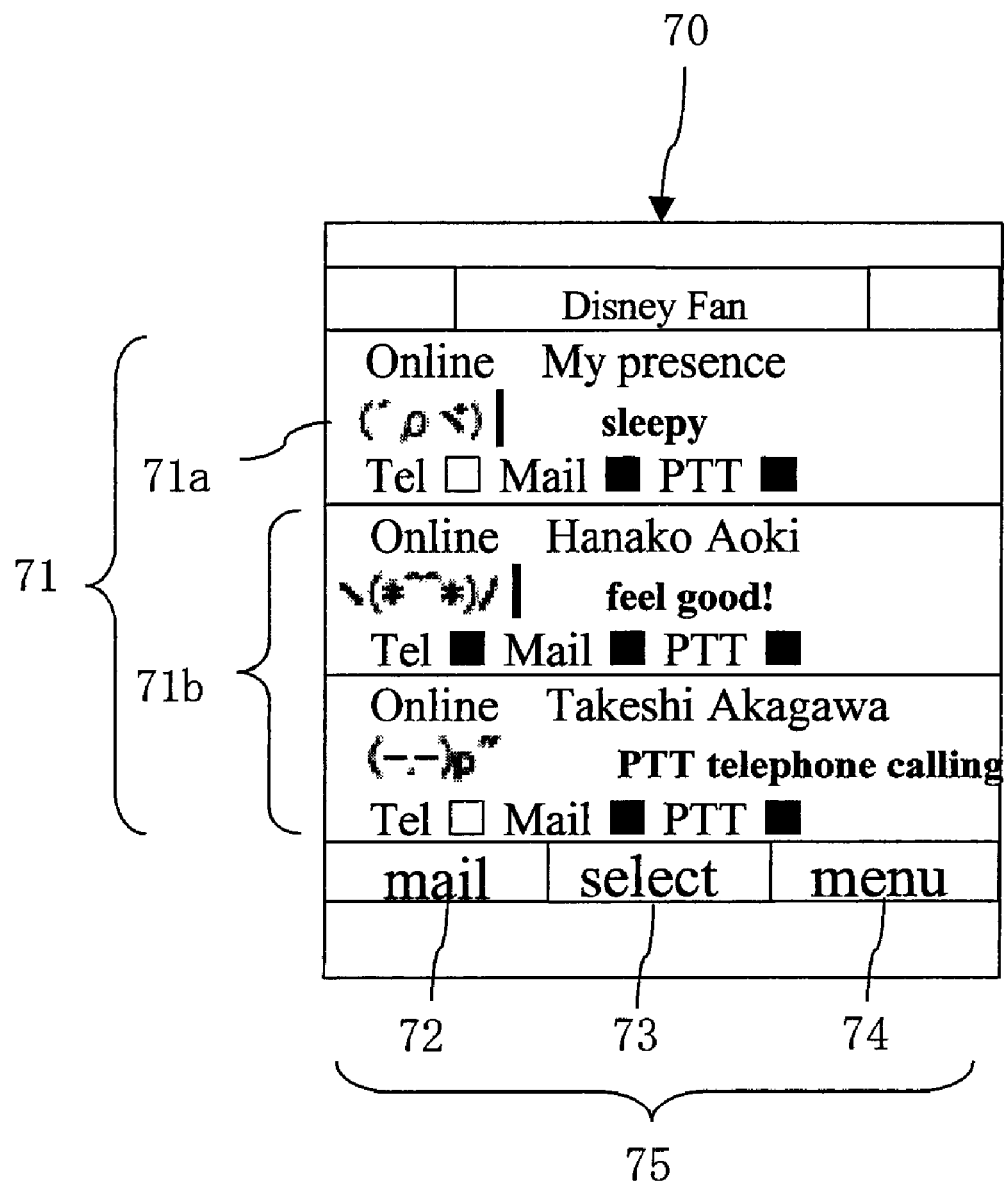
FIG. 7 is a diagram showing a presence information display screen in the cellular phone according to the present invention.

The main controller 41 of the cellular phone 1 displays the presence information display frame 70 as shown in FIG. 7 on the main display 25 through the LCD controller 45 on the basis of the member presence information 61 stored in the storage unit 42.

With respect to the owner of the cellular phone 1 concerned (hereinafter referred to as "identical person") or the members of the group registered as member presence information in the storage unit 42, the presence information display screen 70 has a first area 71 (represented by an identical-person area 71*a*, a member area 71*b* in FIG. 7) for displaying presence information including name information 61*b*, IMS service information 61*h*, mood state information 61*f*, comment information 61*g*, call information 61*c*, mail information 61*d*, PTT information 61*e*, etc., a mail button 72 for transmitting a mail to the cellular phone 1 of the member, a selection button 73 for selecting a member from the first area 71, and a second area in which a menu button 74 for displaying a menu is displayed.

If, by the user of the cellular phone 1, the cellular phone 1 of a member is selected from the first area 71 (the member area 71*b*) and the mail button 72 is selected from the second area, the main controller 41 displays a screen (not shown) for inputting a text of a mail to the cellular phone 1 of the selected member.

Figure 8:
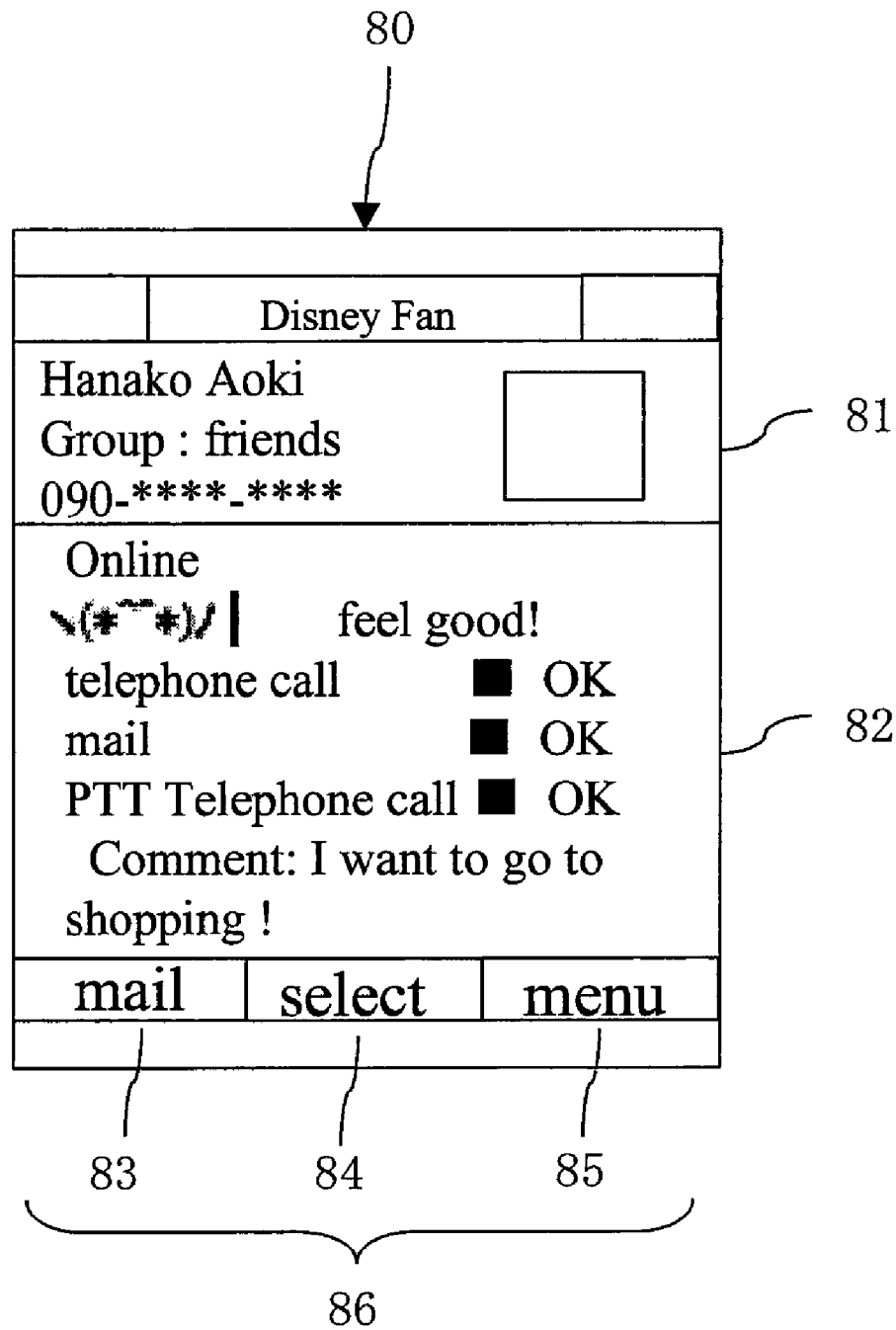
FIG. 8 is a diagram showing a friend profile screen in the cellular phone according to the present invention.

If a member is selected from the first area 71 (the member area 71*b*) and the selection button 73 is selected from the second area 75, the main controller 41 displays a user profile screen 80 of the selected member on the main display 25 as shown in FIG. 8. The user profile screen 80 has a first area 81 for reading out a phone book which is stored with respect to the selected member in the storage unit 42 in advance and displaying the name information 61*b*, a digital photograph, etc., a second area 82 for reading out the member presence information 61 stored in the storage unit 42 and displaying the IMS service information 61*h*, the other presence information, etc., a mail button 83 for transmitting a mail to a member, a selection button 84 for selecting a member from the second area 82, and a third area 86 in which a menu button for displaying a menu is displayed.

Figure 9:
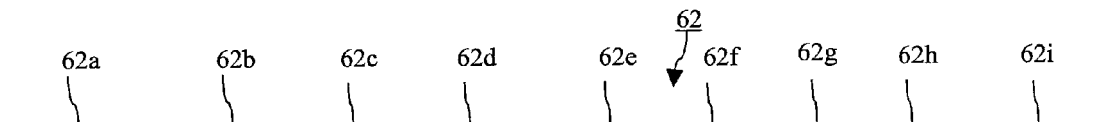
FIG. 9 is a diagram showing a data structure of user presence information stored in an information managing device.

The information managing device 7 stores the user presence information 62 comprising the presence information received from plural cellular phone 1A, 1B, 1C, etc. As shown in FIG. 9, the user presence information 62 contains telephone number information 62a, name information 62b, call information 62c, mail information 62d, PTT information 62e, mood state information 62f, comment information 62g, and IMS service information 62h as in the case of the member presence information 61 stored in the cellular phone 1, and further contains renewal date information 62i representing the date and hour of the latest renewal of these information items.

Furthermore, as shown in FIG. 10, member list information 63 in which owner's telephone number information 63a of plural cellular phone 1A, 1B, 1C, etc. is associated with member telephone number information 63b of the cellular phone 1A, 1B, 1C, etc. registered as members in each of the cellular phones 1A, 1B, 1C, etc. is stored in the information managing device 7 in advance. The information managing device 1 executes transmission processing of presence information on the basis of the member list information 63. The information to be stored is not limited to the telephone number information, and it may be an ID of each cellular phone or the like.

Here, in order to perform mutual communications smoothly, it is necessary that the cellular phone 1 notifies the change of the presence information to the cellular phones 1 of the members of the group on a real-time basis, for example if the application program of the telephone call processing or the like is started.

Here, the user of the cellular phone 1A is assumed as an identical person, and the users of the cellular phone 1B, 1C, etc. are assumed as other members.

Figure 11:
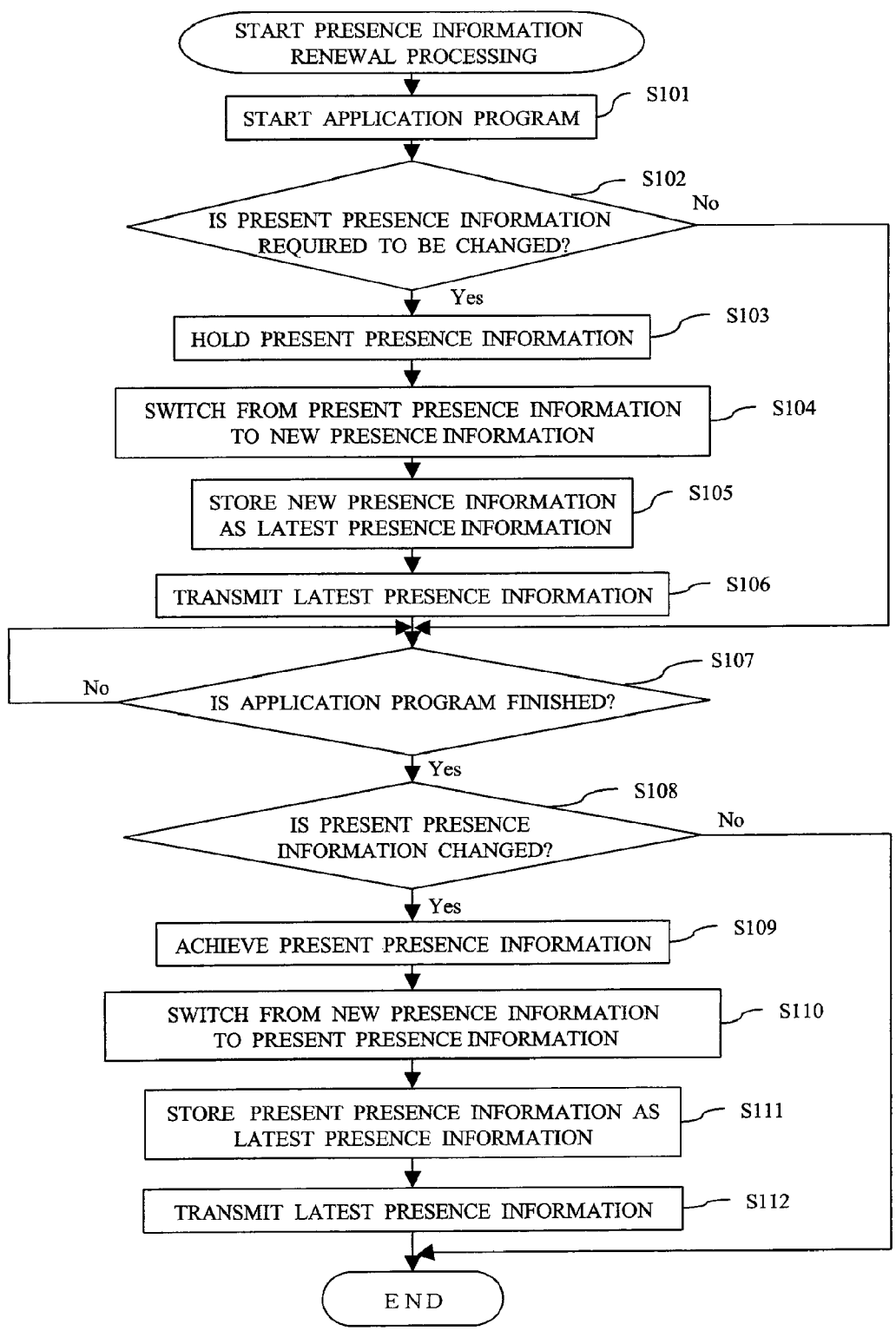
FIG. 11 is a flowchart showing the procedure of executing the presence information renewal processing by the cellular phone according to the present invention.

The process flow of the presence information renewal processing of renewing the presence information in connection with the start of the application program of the telephone call processing or the like by the cellular phone 1A will be described with reference to the flowchart of FIG. 11.

First, the main controller 41 of the cellular phone 1A starts the application program of the telephone call processing or the like on the basis of an instruction based on the user's operation key 24, start reserving information stored in the storage unit 42 in advance, or an instruction based on a request from another cellular phone 1B, 1C or the like (S101). The operation starting trigger may be a press operation of the telephone call button in a calling operation, a phone book reading operation, a calling operation for a PTT connection, an operation for creating a mail or an operation for transmitting a created mail.

The main controller 41 judges whether it is necessary to change the present presence information (S102). For example, according to the presence information renewal processing 60 shown in FIG. 5, if the application program of the telephone call processing is started, it is required to set the presence information to "telephone call impossible" with respect to the telephone call and "PTT impossible" with respect to the PTT telephone call. That is, in this case, the main controller 41 judges whether the present presence information is set to "telephone call impossible" or "PTT telephone call impossible". With respect to the mail, it is unnecessary to set it to "mail impossible", and thus it may be set so that it is not contained in the judgment material of S102.

If it is unnecessary to change the present presence information (No of S102), the application program is directly continued.

If it is necessary to change the present presence information (Yes of S102), the main controller 41 holds the present presence information by storing it into the storage unit 42 or the like (S103). The present presence information is switched from the present presence information to the new presence information on the basis of the presence information renewal processing information 60 shown in FIG. 5 (S104). That is, for example if the telephone call processing is executed, the main controller 41 sets "telephone call impossible", "PTT telephone call impossible" as the new presence information on the basis of the presence information renewal processing information of FIG. 5.

Furthermore, the main controller 41 stores the new presence information as the latest presence information (S105). The main controller 41 transmits the latest presence information to the information managing device 7 (S106).

The main controller 41 also judges whether the application program is finished or not (for example, the judgment as to the end of the function described in "Operation of User" of FIG. 5 such as the judgment as to whether the telephone call is finished or not, the judgment as to whether the camera pickup mode is finished or not or the like) (S107). The application program is finished in response to an instruction based on the user's operation key 24, reserving information stored in the storage unit 42 in advance, or the like. If the application program is not finished (No of S107), the main controller 41 waits with no action.

If the application program is finished (Yes of S107), the main controller 41 judges whether the present presence information is changed in S102 (S108). That is, if the present presence information is stored (the processing of S103), the present presence information is compared with the latest presence information. If they are different from each other, it is judged that the present presence information is changed. If they are not different from each other, it is judged that the present presence information is not changed. Furthermore, if the present presence information is not stored, it is judged that the present presence information is not changed.

If the present presence information is not changed (No of S108), the main controller 41 finishes the presence information renewal processing.

If the present presence information is changed (Yes of S108), the main controller 41 achieves the present presence information held in S103 (S109). The main controller 41 switches the new presence information to the present presence information, thereby restoring to the original presence information (S110). Furthermore, the main controller 41 restores the present presence information switched in S110 as the latest presence information in the storage unit 42 (S111). Then, the main controller 41 transmits the latest presence information representing the latest presence information to the information managing device 7 (S112), and finishes the presence information renewal processing.

Figure 12:
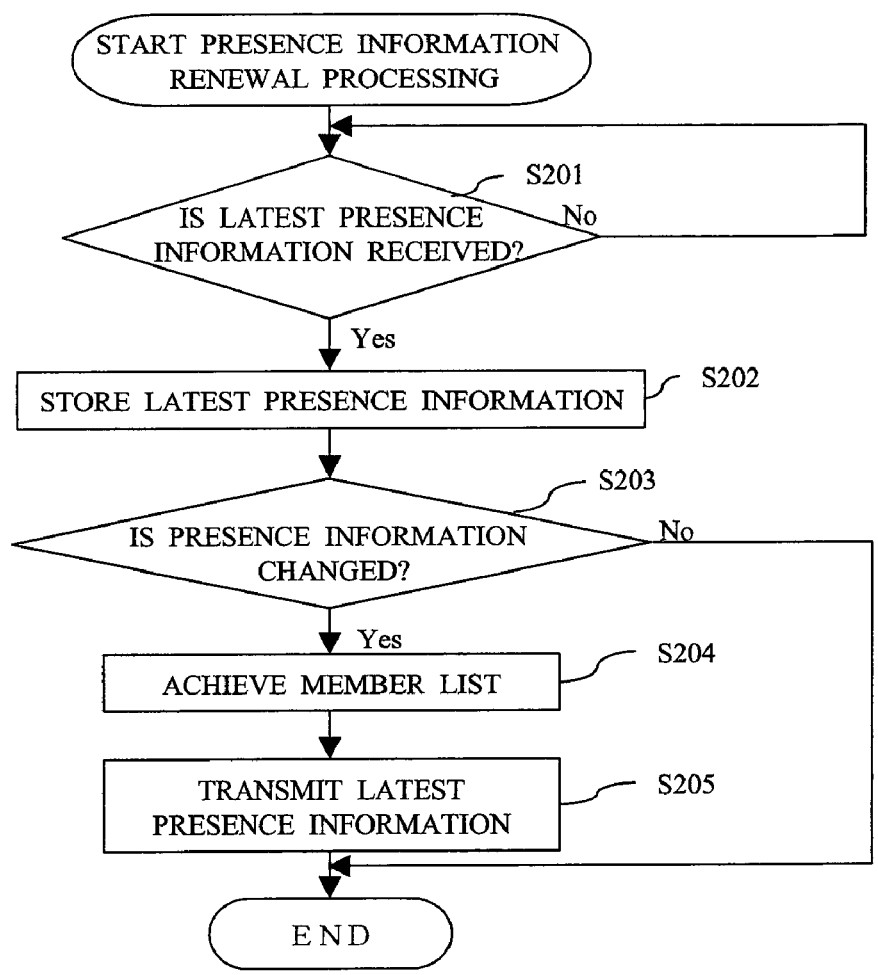
FIG. 12 is a flowchart showing the procedure of executing the presence information renewal processing by the information managing device.

Here, if the cellular phone 1A transmits the latest presence information to the information managing device 7 in S106 and S112, the information managing device 7 receives the latest presence information and executes the presence information renewal processing. This process flow will be described on the basis of the flowchart shown in FIG. 12.

The information managing device 7 judges whether the latest presence information is received from the cellular phone 1A (S201). If the latest presence information is not received (No of S201), the information managing device 7 waits with no action.

If the latest presence information is received (Yes of S201), the information managing device 7 stores the latest presence information received from the cellular phone 1A and the present time (renewal time) (S202). At this time, the information managing device 7 judges whether the presence information is changed or not (S203). That is, the presence information stored in the information managing device 7 is compared with the latest presence information received from the cellular phone 1A. If they are different from each other, it is judged that the presence information is changed.

If the presence information is not changed (No of S203), the information managing device 7 finishes the presence information renewal processing.

If the presence information is changed (Yes of S203), the information managing device 7 achieves a member list of the cellular phone 1A from pre-stored member list information on the basis of telephone number information 70a etc. (S204). The information managing device 7 transmits the latest presence information of the cellular phone 1A to the cellular phone 1B, 1C, etc. of members listed in the member list achieved in S204 (S205). The information managing device 7 finishes the presence information renewal processing.

Figure 13:
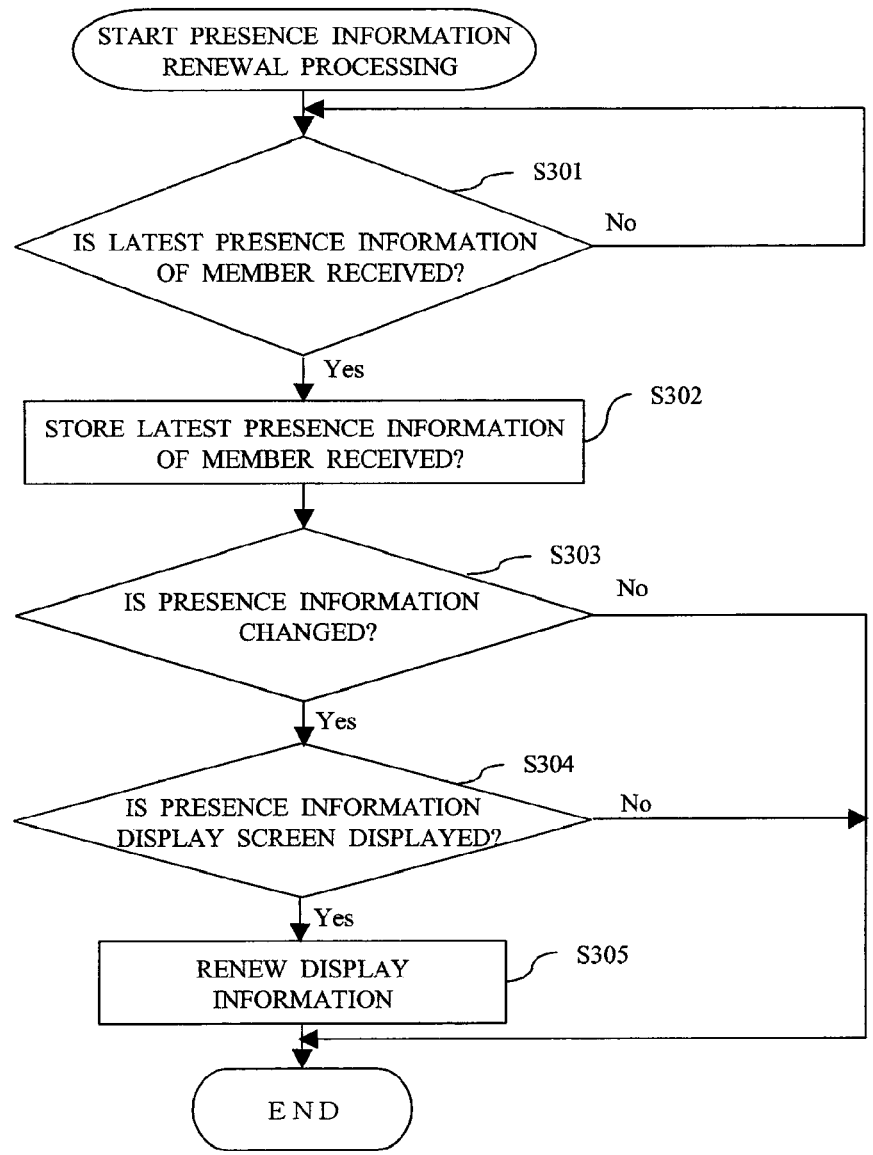
FIG. 13 is a flowchart showing the procedure of executing the presence information renewal processing by the cellular phone according to the present invention.

If the latest presence information is transmitted by the information managing device 7 in S205, the cellular phones 1B, 10, etc. of the members receiving the latest presence information execute the presence information renewal processing. This process flow will be next described with reference to the flowchart of FIG. 13.

The cellular phones 1B, 10, etc. judge whether the latest presence information of the member (in this case, the cellular phone 1A) is received from the information managing device 7 (S301). If the latest presence information is not received (No of S301), the main controller 41 waits without executing the presence information renewal processing.

If the latest presence information is received (Yes of S301), the main controller 41 stores the latest presence information received from the information managing device 7 into the storage unit 42 (S302). At this time, the main controller 41 judges whether the presence information is changed or not (S303). That is, the main controller 41 compares the presence information stored in the storage unit 42 with the latest presence information received from the information managing device 7, and judges whether they are different from each other.

If the presence information is not changed (No of S303), the main controller 41 finishes the presence information renewal processing.

If the presence information is changed (Yes of S303), the main controller 41 judges whether the presence information display screen 70 is displayed on the main display 25 (S304). If the presence information display screen 70 is not displayed (No of S304), the main controller 41 finishes the presence information renewal processing.

If the presence information display screen 70 is displayed (Yes of S304), the presence information display screen 70 is renewed to the presence information display screen 90 having the latest presence information received from the information managing device 7 (S305).

Figure 14:
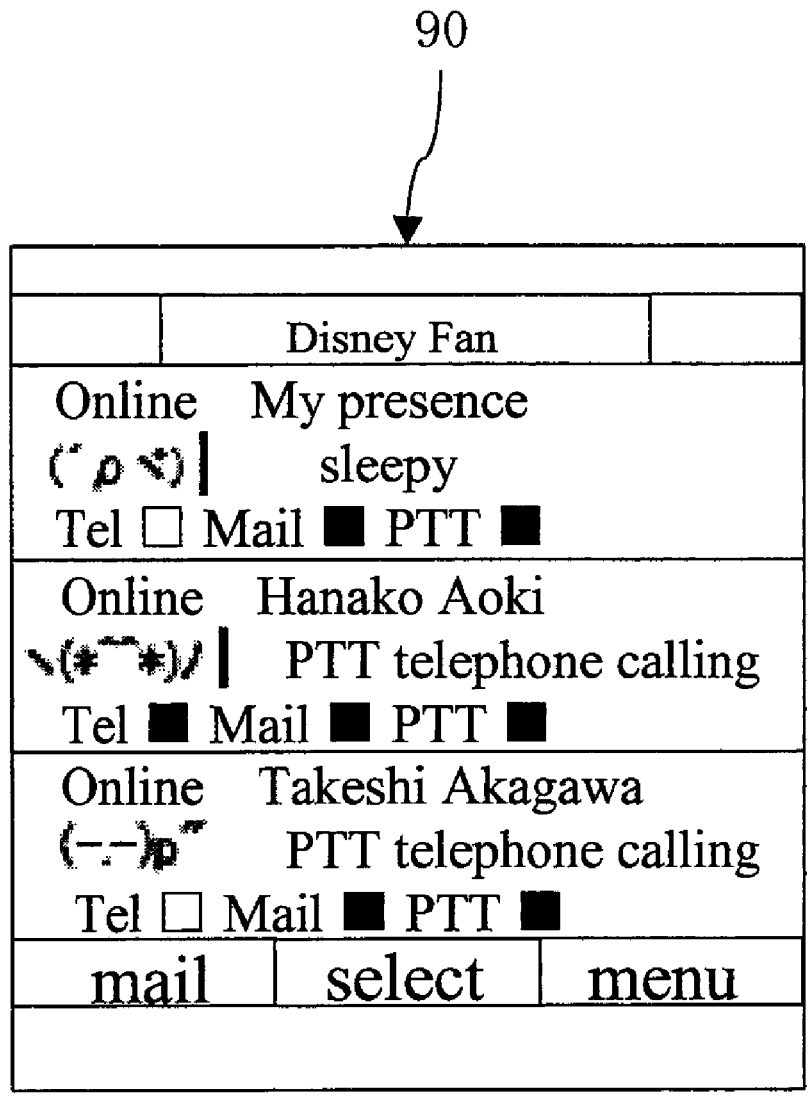
FIG. 14 is a diagram showing a presence information display screen in the cellular phone according to the present invention.

In the presence information renewal processing of the cellular phones 1A, 1B, 1C, etc. and the information managing device 7, the changing of the presence information will be described by comparing the presence information display screen 70 shown in FIG. 7 and the presence information display screen 90 shown in FIG. 14. For example, if Hanako Aoki and Taheshi Akagawa start a PTT telephone call, the telephone call information, mail information and PTT information of Hanako Aoki are set to "telephone call possible", "mail possible" and "PTT possible" as shown in FIG. 7 before the PTT telephone call is started. However, after the PTT telephone call is started, these states are changed to "telephone call impossible", "mail possible" and "PTT possible" as shown in FIG. 14 according to the processing content during the PTT connection shown in FIG. 5. Furthermore, with respect to Takeshi Akagawa, who is on a PTT telephone call before Hanako Aoki joins the PTT telephone call, these states are set to "telephone call impossible", "mail possible" and "PTT telephone call possible" as shown in FIG. 7, and thus the presence information is not required to be changed. Accordingly, after the PTT telephone call is started, "telephone call impossible", "mail possible" and "PTT telephone call possible" are also displayed in FIG. 14 as in the case of FIG. 7.

Furthermore, if the PTT telephone call is finished, the telephone call information, the mail information and the PTT telephone call information of Hanako Aoki are changed to "telephone call possible", "mail possible" and "PTT telephone call possible" before the start of the PTT telephone call again as shown in FIG. 7. The presence information of Takeshi Akagawa, who remains on the PTT telephone call, is not changed and thus it is kept unchanged.

The presence information renewal processing is executed as described above if the application program of the telephone call processing or the like in the cellular phone 1A, 1B, 10, etc. is started.

Figure 15:
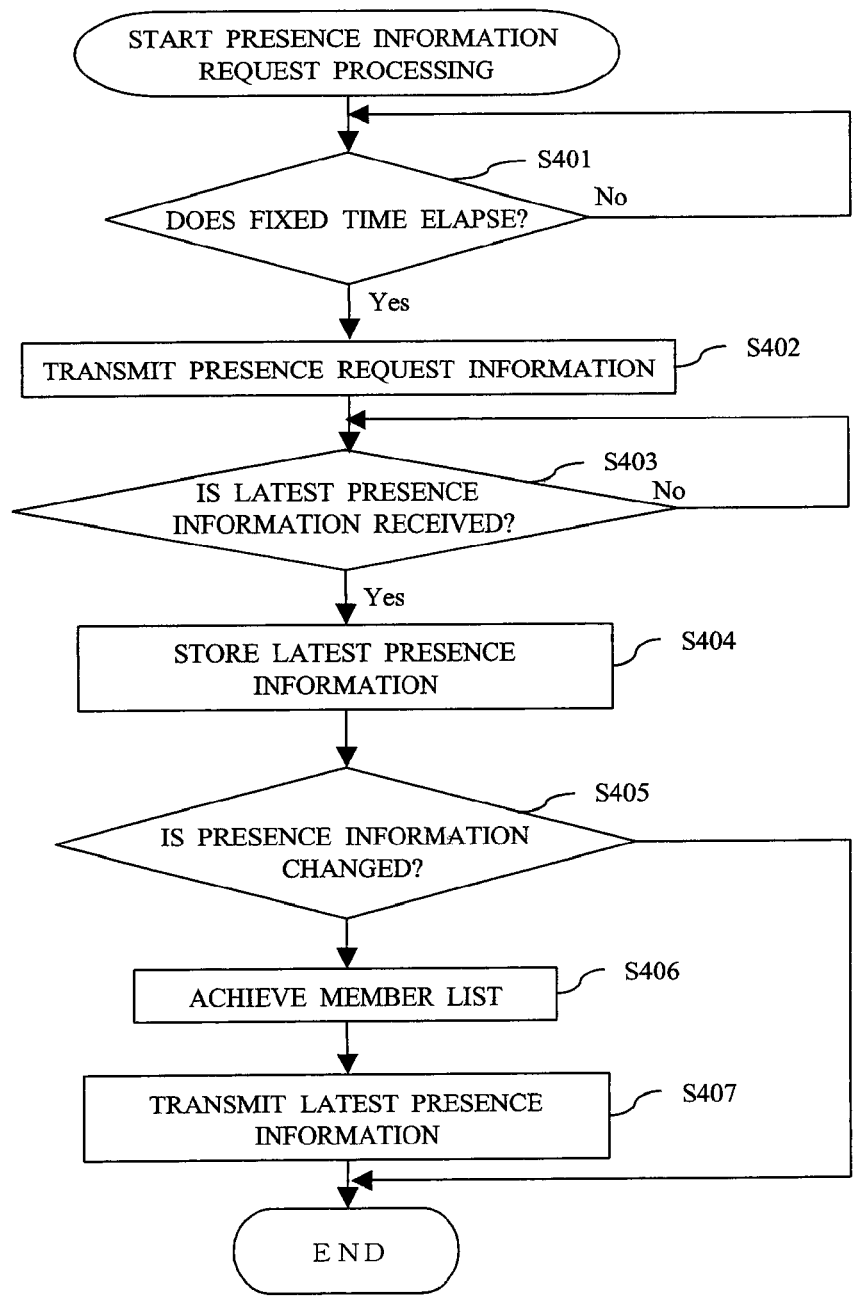
FIG. 15 is a flowchart showing the procedure of executing the presence information request processing by the information managing device.

The information managing device 7 executes the presence information request processing of requesting the latest presence information at a fixed time interval (for example, 1 minute) to each of the cellular phones 1A, 1B, 10, etc. so that the latest presence information can be supplied to each of the cellular phones 1A, 1B, 1C, etc. in an up-to-date manner. This presence information request processing will be described with reference to the flowchart shown in FIG. 15. In this case, the information managing device 7 executes the presence information request processing on the cellular phone 1A.

The information managing device 7 judges whether a fixed time elapses (S401). If the fixed time does not elapse (No of S401), the information managing device 7 waits without executing the presence information renewal processing.

If the fixed time elapses (Yes of S401), the information managing device 7 requests the latest information to the cellular phone 1A by transmitting presence request information for promoting the transmission of the latest presence information to the cellular phone 1A (S402).

In response to the request of the latest presence information in S402, the information managing device 7 judges whether the latest presence information is received from the cellular phone 1A (S403). If no latest presence information is received (No of S403), the information managing device 7 waits with no action.

If the latest presence information is received (Yes of S403), the information managing device 7 stores the latest presence information received from the cellular phone 1A and the present time (the renewal time) (S404).

At this time, the information managing device 7 judges whether the presence information is changed or not (S405). The pre-stored presence information and the latest presence information received from the cellular phone 1A are compared with each other. If they are different from each other, it is judged that the presence information is changed. If the presence information is not changed (No of S405), the information managing device 7 finishes the presence information renewal processing.

If the presence information is changed (Yes of S405), the information managing device 7 achieves the member list of the cellular phone 1A from the pre-stored member list information (S406). The information managing device 7 transmits the latest presence information to the cellular phones 1B, 1C, etc. listed in the member list achieved in S406 (S407). The information managing device 7 finishes the presence information renewal processing.

In this case, the information managing device 7 requests the latest presence information to the cellular phone 1A. However, the present invention is not limited to this embodiment, and the presence request information may be transmitted to plural cellular phones 1A, 1B, 1c, etc. all at once or may be stepwise transmitted to each of the cellular phones 1A, 1B, 1C, etc.

Figure 16:
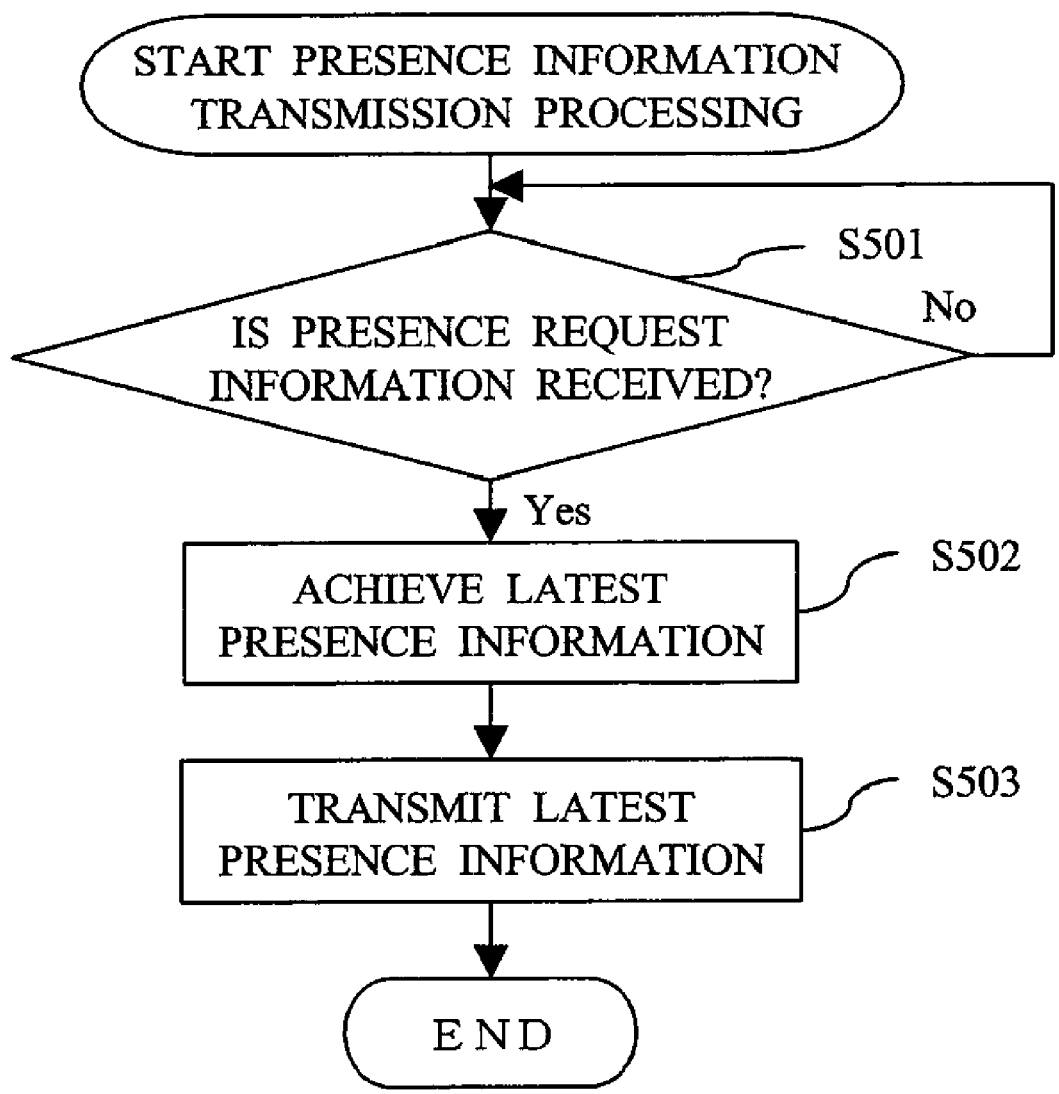
FIG. 16 is a flowchart showing the presence information transmission processing by the information managing device.

Furthermore, if the information managing device 7 transmits the presence request information in S402, the cellular phone 1B, 1C receiving this presence request information transmits the latest presence information. This presence information transmission processing will be described with reference to the flowchart shown in FIG. 16.

The main controller 41 of each of the cellular phone 1B, 1C, etc. judges whether the presence request information is received from the information managing device 7 (S501). If no presence request information is received (No of S501), the main controller 41 waits without executing the presence information transmission processing.

If the presence request information is received (Yes of S501), the main controller 41 of each of the cellular phones 1B, 1C, etc. achieves the latest presence information stored in the storage unit 42 (S502). The main controller 41 of each of the cellular phones 1B, 1C, etc. transmits the latest presence information achieved in S502 to the information managing device 7 (S503). Then, the main controller 41 finishes the presence information transmission processing.

As described above, the information managing device 7 achieves the latest presence information from each of the cellular phones 1A, 1B, 1C, etc. every time a fixed time elapses, whereby the cellular phones 1A, 1B, 1C, etc. can achieve the mutual latest presence information in an up-to-date manner.

In the above embodiment, the cellular phones 1A, 1B, 1C, etc. request the latest presence information to the information managing device 7 at a fixed time interval. However, the present invention is not limited to the above embodiment, and each of the cellular phones 1A, 1B, 1C, etc. may transmit the latest presence information thereof to the information managing device 7 at a fixed time interval.

According to the cellular phone 1 of this embodiment, when an application program is started in the cellular phone 1A or the like, the cellular phone 1A transmits the latest presence information to the information managing device 7, and the information managing device 7 receiving this latest presence information transmits the latest presence information of the cellular phone 1A to the other cellular phones 1B, 1c, etc., whereby the cellular phones 1A, 1B, 1C, etc. can mutually notify the latest presence information on a real-time basis.

The present invention has been described with respect to a cellular phone type cellular phone 1. However, the present invention is not limited to this embodiment, and the present invention may be applied to PDA (Personal Digital Assistant), a personal computer and other types of phones.

Furthermore, the series of processing described in the above embodiment of the present invention may be executed not only by software, but also by hardware.

Still furthermore, in the embodiment of the present invention, the steps of the flowcharts are executed time-sequentially in the order described above. However, they are not necessarily required to be executed time-sequentially, and they may be executed in parallel or individually.

Yet still further, the present invention may also be applicable to phones which are equipped with a "call waiting" function. In this case, the presence information may include a call waiting information item, as well as a telephone call information item. Thus, for example, if the user of a phone is on a telephone call, the telephone call information would be set to "conducting telephone call" and the call waiting information would be set to "call waiting telephone call possible." This would facilitate a member of the group, such as the boss of the user, to be able to make an important telephone call to the user even if the user is already conducting a telephone call. The call waiting information would only be displayed if the user is conducting a telephone call. If the user is not conducting a telephone call, it would be unnecessary to display the call waiting information. And if the user is were conducting a telephone call and a call waiting telephone call simultaneously, then the telephone call information and the call waiting information would be set to "not possible."

What is claimed is:

1. A communication device which performs communication with an external communication device via a wireless communication network, comprising:
   a transmitter unit which transmits outgoing data to the external communication device via the network;
   a storage unit which stores presence information data of the communication device for representing an operation state of the communication device and for notifying the external communication device of the operation state; and
   a control unit which runs an application program, wherein the control unit is configured to identify whether the presence information is required to be changed or maintained upon starting to run the application program, and wherein the control unit is configured to change the presence information data stored in the storage unit and to transmit the changed presence information data to the external communication device as the outgoing data using the transmitter unit upon identifying the presence information data as being required to be changed.

2. The communication device according to claim 1, further comprising an operation unit which accepts a user's operation, wherein the control unit starts the application program upon the operation unit accepting the user's operation to start the application program.

3. The communication device according to claim 1, wherein the control unit maintains the presence information data stored in the storage unit upon identifying the presence information data as being required to be maintained.

4. The communication device according to claim 1, wherein the presence information data includes a piece of data which indicates whether voice communication through the communication device is being disabled.

5. The communication device according to claim 1, wherein the presence information data includes a piece of data which indicates whether an email receiving operation through the communication device is being disabled.

6. The communication device according to claim 1, wherein:
   the application program is related to an incoming call;
   the presence information data includes a piece of data which indicates whether a PTT telephone call through the communication device is being disabled; and
   the control unit updates the piece of data so as to indicate that the PTT telephone call is being disabled upon identifying the presence information data as being required to be changed.

7. The communication device according to claim 1, wherein:
   the application program is related to an incoming call;
   the presence information data includes a piece of data which indicates a comment to be displayed; and
   the control unit updates the comment upon identifying the presence information data as being required to be changed.

8. The communication device according to claim 1, wherein the control unit changes the presence information data after the communication device finishes running the application program.

\* \* \* \* \*